May 26, 1959  F. M. LIVEZEY  2,888,632
TRANSISTOR CURRENT REGULATING CIRCUITS
Filed Aug. 23, 1956

Frederic M. Livezey
INVENTOR.

BY
AGENT

United States Patent Office 2,888,632
Patented May 26, 1959

2,888,632

TRANSISTOR CURRENT REGULATING CIRCUITS

Frederic M. Livezey, Drexel Hill, Pa., assignor to The Baldwin Piano Company, Cincinnati, Ohio, a corporation of Ohio Application August 23, 1956, Serial No. 605,746

8 Claims. (Cl. 323—4)

The present invention relates generally to transistor current regulating systems, and more particularly to systems for maintaining current flow to a load at a predetermined value, independent within limits of values of load resistance, supply voltage or changes in transistor characteristics.

Briefly describing a preferred embodiment of the present invention, the collector to emitter circuit of a first transistor is inserted in series with a fixed and variable resistance and with a load in which current is to be regulated. The fixed resistance is connected in the emitter-base circuit of the first transistor. A collector-emitter circuit of a second transistor is connected in series with the fixed resistance and with a source of reference voltage. The base of the latter transistor is connected to one side of the variable resistance.

The variable resistance is set for a desired value of load current. If the load current tends to increase, for any reason, the voltage drop across the variable resistance increases correspondingly. Since the base-emitter circuit of the second transistor is connected across the reference source of voltage and the variable resistance, the voltage appearing between base and emitter decreases, decreasing base current, and consequently collector current. Decrease of collector current causes the voltage across the fixed resistance to decrease, which in turn decreases base current, and hence collector current, of the first transistor. Stated in other terms the collector to emitter resistance of the first transistor increases, in response to an increase of load current, offsetting the original tendency of the load current to increase.

Since the output current follows the reference voltage source, variations in load current can be accomplished by varying the reference source amplitude, and in particular a constant A.-C. load current may be superposed on a constant D.-C. load current by inserting an A.-C. voltage source in series with the source of D.-C. reference voltage.

For purpose of illustration only the system of the invention is described as employing NPN type transistors. PNP type transistors may be substituted without departing from the spirit and teaching of the invention, by reversing the polarity of the reference voltage source and interchanging input and output connections.

Some advantageous properties of transistors, in voltage regulators, pertain to their small size and ruggedness, their long life and small power consumption, and in the relatively small internal voltage drops associated with transistor devices, which, in contradistinction to vacuum tube type series regulator systems permits the output voltage of a transistor regulator system to approach that of the input.

In some respects the transistor is analogous in its operation and functioning to the vacuum tube triode, the collector, emitter and base of the transistor corresponding, respectively, to the anode, cathode and control electrode of the triode. In operation of an NPN type transistor positive voltage is applied to the collector, with respect to the base, and negative voltage to the emitter. An opposite set of operating conditions applies to the PNP type transistor.

The operating characteristics of the transistor are far more sensitive to temperature variations of the transistor than are the operating characteristics of the vacuum tube counterpart. In the practice of the present invention the system responds to current change, however induced, i.e., whether due to load changes or to variations in transistor characteristics, since the system so adjusts itself as to maintain a predetermined relation between two voltages, one of which is representative of output current and the other of which is a reference voltage, and the adjustment occurs regardless of the cause of divergence of the two voltages, i.e., whether due to load change, to input voltage change, or to variation in transistor circuit parameters.

It is accordingly, a broad object of the present invention to provide a novel current regulating system.

It is another object of the present invention to provide a system of current regulation in which the flow of current generates a corresponding voltage, which is compared with a reference voltage, the difference being employed to regulate the internal resistance of a transistor in series with the load in such sense as to maintain the current constant.

It is another object of the invention to provide a system for supplying a fixed value of A.-C. current in superposition of a fixed value of D.-C. current, during variations of load resistance and of D.-C. source voltage.

The above and still further objects, features and advantages of the present invention will become apparent upon consideration of the following detailed description of one specific embodiment thereof, especially when taken in conjunction with the accompanying drawings, wherein.

Figure 1:
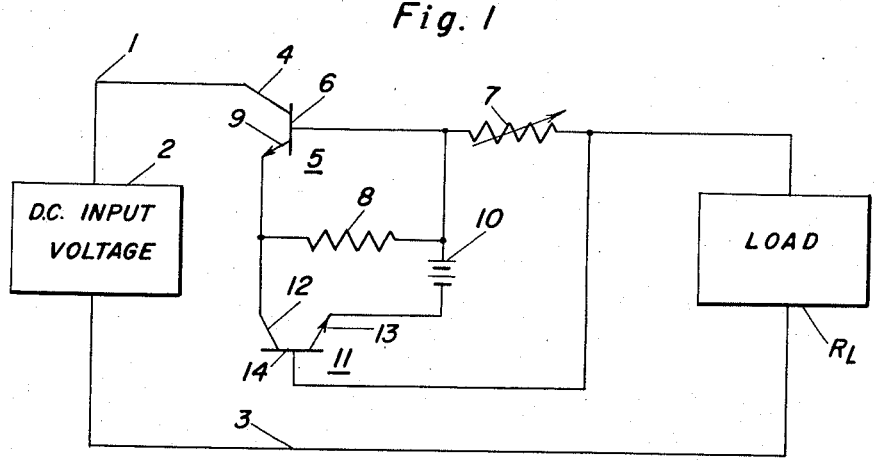
Figure 1 is a schematic circuit diagram of a preferred embodiment of the present invention, designed for regulating the value of a D.-C. current.

Referring now more particularly to the accompanying drawings, the reference numeral 1 denotes the positive terminal of a D.-C. current source 2, the line 3 being connected to the negative terminal. The collector 4 of an NPN transistor 5 is connected to the terminal 1. The emitter 9 of transistor 5 is connected in series with a variable resistance 7 and a fixed resistance 8 to one terminal of a load $R_L$. The base 6 of transistor 5 is connected to the junction of the fixed resistance 8 and the variable resistance 7.

Connected across the resistance 8, and in series with a reference voltage source 10 is the collector-emitter circuit of a transistor 11, having a collector 12, an emitter 13 and a base 14. The base 14 is connected to the positive side of the load $R_L$ and the source 10 with its negative terminal directly with the emitter 13.

It follows that the collector-to-emitter circuit of the transistor 5 is connected in series with the fixed resistance 8, the variable resistance 7 and the load $R_L$, and that variations of internal resistance of the collector-to-emitter circuit of transistor 5 may vary the load current.

The variable resistance 7 may be employed to set the system for a desired value of load current, developing a voltage across itself which is proportional to that current. The voltage across the resistance 7 is applied in opposition to the voltage of reference source 10 in the emitter-to-base circuit of the transistor 11. If the load current tends to increase, the voltage drop across resistance 7 increases correspondingly. The net emitter-to-base voltage of transistor 11 decreases, decreasing base current, and therefore collector current. The decrease in collector current of transistor 11 decreases the voltage drop across resistor 8, decreasing the net emitter-to-base current of transistor 5. This serves to increase the collector-to-emitter resistance of the latter, or to decrease its collector current. The tendency of the load current to increase is thus offset.

While the preferred embodiment of the invention, as illustrated and described, employs N-P-N type transistors, this is for purpose of illustration only. PNP type transistors may be utilized, if desired, provided that the polarity of reference source 10 is reversed and the input and output connections are interchanged.

By way of example only the following component values and reference voltage values are representative of typical operation:

D.C. input voltage of source _____ 10 v. D.C.
Voltage of reference source 10 _____ 4½ v. D.C.
Resistance 8 _____ 1000 ohms
Resistance 7 _____ 50,000 ohms A preferred transistor type is the Texas Instrument #904 Silicon Transistor.

The operation of the system has been described by reference to the sequence of events following an attempted increase of load current, without reference to the cause of the increase, i.e., whether due to load resistance change, to source voltage change, or to variation in transistor parameters. The sequence following an attempted decrease of load current will be evident from the preceding discussion.

It is sometimes desired to provide a fixed A.-C. current superposed on a fixed D.-C. current, both values of current remaining fixed despite variations in D.-C. supply voltage or circuit parameters, and particularly despite variations in load resistance. This result may be accomplished by including a source of A.-C. signal in series with the source of D.-C. signal, in the system of Figure 1 of the accompanying drawings.

Figure 2:
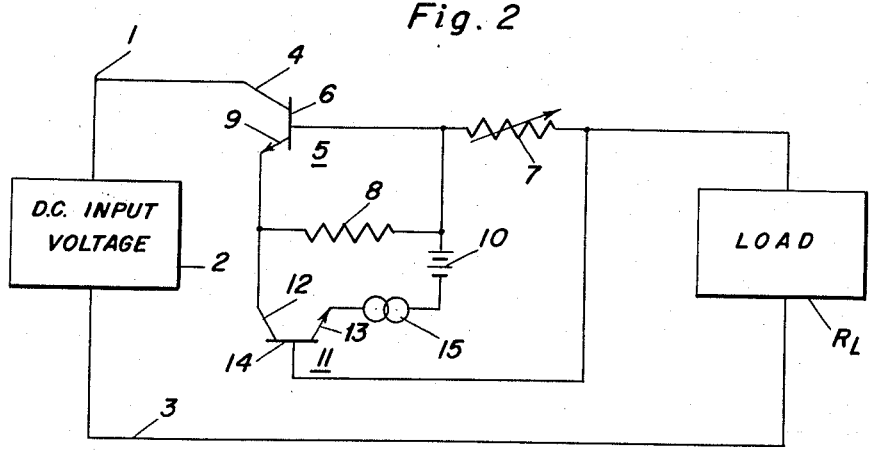
Figure 2 is a schematic circuit diagram of a modification of the system of Figure 1, including provision for supplying regulated A.-C. current in superposition of a regulated D.-C. current.

Referring now more particularly to Figure 2 of the accompanying drawings and applying the same numerals of reference to corresponding elements of Figures 1 and 2, an A.-C. generator 15 is connected in series with the reference source 10. As the voltage of generator 15 increases and decreases periodically relative to the mean value established by the D.-C. source 10, current flow through resistance 8 and collector 12 correspondingly increases and decreases. The voltage between emitter 9 and base 6 of transistor 5 correspondingly increases and decreases, causing the current to collector 4 to increase and decrease. Current flow to load R_L correspondingly increases and decreases, about the mean value established by the D.-C. value of source 10. The described operation may be generalized in the statement that load current is proportional to the value of reference voltage 10, and may be varied by varying the latter. The system reacts to variations in the voltage of source 10 by varying load current in such sense and amount as to maintain a predetermined relation between the voltage of source 10, and the voltage across resistance 7, due to current flow through resistance 7.

While I have described and illustrated one specific embodiment of the present invention, it will become apparent that variations of the specific details of construction may be resorted to without departing from the true spirit and scope of the invention as defined in the appended claims.

What I claim is:

1. System for regulating signal amplitude in a load comprising a first transistor having a first collector, emitter and base, a second transistor having a second collector, emitter and base, a source of reference voltage, a resistance, means connecting said source of reference voltage and said resistance in series between said second collector and emitter, means for developing a further voltage proportional to said signal amplitude, means applying said further voltage and said reference voltage in opposition between said second emitter and said second base, means for connecting said first emitter and said first base across said resistance, and means coonnecting said first collector and emitter in series with said load.

2. The combination in accordance with claim 1, wherein said signal is current and wherein said means for developing a further voltage proportional to said signal amplitude includes a resistance in series with said load.

3. The combination in accordance with claim 2, wherein said source of reference voltage includes a source of D.-C. voltage and a source of A.-C. voltage in series.

4. A system for regulating current flow in a load, comprising a semi-conductor device in series with said load, a fixed and variable resistance in series with said load, said semi-conductor device including a control element for controlling current flow through said semi-conductor device to said load, a semi-conductor amplifier including said fixed resistance, a source of reference potential, means for supplying control potential to said control element comprising said semi-conductive amplifier and means responsive to the difference between the potential of said source of reference potential and the potential existing across said variable resistance in series with said load for controlling current flow in said semi-conductor amplifier.

5. A system for regulating current flow to a load, comprising means for developing a voltage proportional to said current flow to a load, a source of reference voltage, means for deriving a control voltage equal to the algebraic difference between said reference voltage and the voltage proportional to said current flow to a load, a transistor amplifier, a resistance in series with said transistor amplifier, continuously operating means for controlling current flow via said transistor amplifier to said resistance in response to said control voltage, a transistor device in series with said load, and means for continuously controlling current flow via said transistor device to said load in response to voltage across said resistance.

6. A system for regulating current in a load, comprising a first transistor having first, second and third electrodes, a further transistor having fourth, fifth and sixth electrodes, a source of reference voltage, a resistance, means connecting said source of reference voltage and said resistance in series between said fourth and fifth electrodes, means for developing a further voltage proportional to said current in said load, means applying said further voltage and said reference voltage in opposition between said fourth electrode and said sixth electrode, means connecting said first electrode and said third electrode across said resistance, and means connecting said first electrode and said second electrode in series with said load.

7. A system for regulating current in a load, comprising a first transistor having control and output electrodes, a second transistor having control and output electrodes, a resistance in series with said load for developing a comparison voltage proportional to said current to said load, a source of reference voltage, means connecting said resistance and said source of reference voltage in series with the control electrodes of said second transistor, a control resistance, connected between the output electrodes of said second transistor in series with said source of reference voltage, means connecting said control resistance between the control electrodes of said first transistor, and means connecting the output electrodes of said first transistor in series with said load.

8. A system for regulating current flow from a source into a load as a function of a control voltage, comprising a first transistor having first base, emitter and collector electrodes, means connecting said first collector and first emitter electrodes in series between said source and said load, a comparison resistance in series with said load and carrying load current, a second transistor having second base, emitter and collector electrodes, a resistance, a source of said control voltage, means connecting said resistance and said source of control voltage in series between said second collector and emitter electrodes, means connecting said source of control voltage and said comparison resistance in series between said second emitter and said second base electrodes, and means connecting said resistance between said first emitter and said first base electrodes, said source or reference voltage being poled to oppose the voltage drop across said comparison resistance, and said transistors being both of the same conductivity type.

References Cited in the file of this patent

UNITED STATES PATENTS

| | | |
|---|---|---|
| 2,751,549 | Chase | June 19, 1956 |
| 2,776,382 | Jensen | Jan. 1, 1957 |